United States Patent Office 2,833,724
Patented May 6, 1958

2,833,724
CONCENTRATING SILICA SOLS WITHOUT PARTICLE GROWTH

Guy B. Alexander and John R. McWhorter, Wilmington, Del., assignors to E. I. du Pont de Nemours and Company, Wilmington, Del., a corporation of Delaware No Drawing. Application September 28, 1954
Serial No. 458,963

3 Claims. (Cl. 252—313)

This invention relates to processes for concentrating aqueous silica sols to give sol products in which the silica particles are uniform in size and substantially free of occluded impurities, and is more particularly directed to such processes in which separate bodies of dilute sol having a pH in the range of 7.0 to 10.5 and containing 1 to 5 percent $SiO_2$ are heated simultaneously at a temperature in the range of 50 to 150° C., water is evaporated from one body of the sol, and sol at substantially the same temperature from the second body is added to keep the volume of the first body substantially constant, and the evaporation is continued until the concentration of silica is in the range of 10 to 50 percent $SiO_2$.

When attempting to concentrate an aqueous silica sol, one of the principal problems is control of the particle size and particle uniformity. It has been shown by Bechtold and Snyder in U. S. Patent 2,574,902 that when an alkalized silica sol is concentrated by evaporation at constant volume, the volume being maintained by adding dilute sol to a concentrated heel of sol in the evaporator, a build-up of the silica particles occurs. Thus, the silica in the feed adds on to the silica particle already present in the evaporator with the result that the particles in the sol grow to a substantial degree. For instance, particles in an original sol may be less than 10 millimicrons in diameter and by the techniques of Bechtold and Snyder may be grown to a size of about 150 millimicrons.

While sols of built-up silica particles are highly useful for a wide variety of purposes, there are circumstances under which concentration of a silica sol is desired without too much simultaneous growth or build-up. Thus, it is sometimes desired to produce a sol which is relatively concentrated—say in the order of 10 to 25 percent $SiO_2$—in which the silica particles are of such small diameter that the surface area of silica present is relatively large—say up to 800 m.²/g.

There are also circumstances wherein a sol of very uniform-sized particles is desired, particularly at high surface area. In the operation of evaporators for concentration of sols by constant volume, difficulty has been encountered in achieving the desired degree of uniformity.

When silica sols are concentrated by adding a feed of small sized particles to a heel containing large particles there is a tendency for the small particles to adhere to the larger particles. In an alkaline medium, this action tends to cause occlusion of the alkali metal ions present. Thus, there is a tendency for a sol alkalized with a sodium base to occlude sodium ions which cannot be washed out or even readily be removed by ion exchange with a hydrogen-form ion exchanger. While the amount of such occluded sodium is not large enough to interfere with most applications for silica sols, there are various situations in which any sodium so present is distinctly undesirable.

Although the difficulties above-mentioned would appear to be inherent in any constant-volume evaporation concentrating process, it is not feasible to adopt such alternatives as the batch-wise evaporation of a large volume of sol to a smaller volume by such means as direct boil-down in a kettle. Such a method is not only inefficient with respect to equipment utilization, but also results in a relatively large degree of turbidity and non-uniformity of particle size in the concentrated sol due to unavoidable irreversible drying of silica on exposed heat-exchange surfaces, the dry flakes serving as nuclei for the above-described build-up growth. Therefore, although some of the previously mentioned objections can be avoided by batch boil-down, other problems are introduced which offset any advantage gained.

The present invention is concerned with processes which make efficient use of conventional evaporators for concentrating silica sols and which at the same time avoid any undue growth of the silica sol particles in the evaporator, and which produce sol products in which the silica particles are uniform in size and substantially free of occluded impurities. Thus, the difficulties hitherto encountered are circumvented and results hitherto impossible by prior art methods are accomplished.

Now, according to the present invention these desirable results are obtained by processes comprising heating separate bodies of a dilute silica sol having a pH of 7.0 to 10.5 simultaneously at a temperature of 50 to 150° C., evaporating water from one body of the sol, and adding sol at substantially the same temperature from the second body to keep the volume of the first body substantially constant.

The processes herein described now permit one to effect any desired growth of particles prior to the step of concentrating the sol by evaporation of water therefrom. Excessive growth of the silica particles in the evaporator is thereby avoided and the rapid decrease in silica surface area which necessarily accompanies particle growth is likewise avoided. A much higher degree of control over the size of silica particles in the sol produced is thus insured and the occlusion of impurities which results from adding small silica particles as a feed sol to large silica particles in a "heel" sol is minimized. The preparation of concentrated silica sols, containing 10 to 25% $SiO_2$ and having a small particle size (4 to 10 millimicrons, corresponding to a surface area of 800 to 300 m.²/g., is made possible.

The silica sol which is concentrated according to a process of this invention may be prepared by a variety of methods with which the art is already familiar. The sol may contain particles of any desired size, but obviously the greatest advantage of the process is achieved when using a sol of small particles—smaller than about 4 millimicrons. The starting sol should be relatively free of impurities such as the salts formed when a soluble alkali silicate solution is acidified with an acid such as sulfuric. Thus one may, for instance, start with a conventional sol containing—say, 6% $SiO_2$, made by neutralizing sodium silicate with sulfuric acid—and dialyze out the methathetically-produced sodium sulfate.

A preferred method for making the starting sol, however, is according to the disclosure of the Bird U. S. Patent 2,244,325, whereby a dilute sodium silicate solution is passed through a cation-exchange resin in the hydrogen form to remove sodium ions and replace them with hydrogen. In such a method the necessary pH adjustment can be effected by passing the silicate solution through the resin at such a rate that there is enough break-through of sodium silicate to give the desired degree of alkalization.

The pH of the starting sol, however prepared, should be adjusted into the range of from 7.0 to 10.5, a pH in the range of from 7.5 to 9.0 being particularly preferred. Although pH can be used as a measure of the ratio of silica to alkali in the sols, a preferred method consists of treating a deionized silica sol with alkali, e. g., NaOH solution, sodium silicate solution, KOH, $(CH_3)_4NOH$, or other similar alkaline solution, until the ratio of $SiO_2:M_2O$ (where M is the monovalent cation in the alkali) is in the range of 30:1 to 200:1, and preferably in the range of 50:1 to 120:1. The pH, or ratio, can be adjusted either before or after dividing the sol into the two separate bodies as hereinafter described.

The suitably selected silica sol is at this stage divided into two separate bodies. These bodies are usually of unequal volume, as in the case of the volume in an evaporator and in a feed supply tank connected to the evaporator. The relative volumes of feed will depend on the amount of concentration to be effected in the evaporator. Thus, if a five-fold concentration effect is to be achieved the body of sol in the feed tank will be four times as large as that in the evaporator.

The separate bodies of silica sol are heated at a temperature in the range of 50 to 150° C., a temperature in the range of 60 to 100° C. being preferred. It will readily be evident that the initial heating up to this temperature may be accomplished by heating the sol before the division into two bodies; the important thing is to continue the heating after the division and to maintain the temperature of the separate bodies substantially the same. We have found this temperature equality to be relatively critical, a difference of as little as 10° C. between the two bodies resulting in some degree of uncontrolled growth. It will be evident that if the temperature selected is above the boiling point of the sol the heating will need to be carried out in a confined space. On the other hand, the temperature selected will be in part based upon the operation of the evaporator and since this may be a multiple effect evaporator and may employ evaporation at reduced pressure the temperature is often preferably below the normal atmospheric boiling point.

Now after the indicated temperature control has been established, concentration of one body of the sol can be readily accomplished at constant volume by evaporating water from that body of sol and maintaining the volume by addition of the requisite amount of sol from the second body. In a practical application this would mean that water is evaporated from the sol in the evaporator and the volume of that sol is maintained constant by adding the requisite amount of makeup from a heated sol in a feed tank. The heel in the evaporator and the feed being at the same temperature, growth of the particles in the evaporator by reason of the addition thereto of particles in the feed is substantially lessened—that is, build-up is retarded.

The evaporation and maintenance of constant volume can be continued until the desired concentration of silica is reached and it will be found that relatively high concentrations of silica can be obtained—in the order of 10 to 50 percent, and more particularly, 10 to 25 percent $SiO_2$.

The invention will be better understood by reference to the following illustrative examples.

*Example 1*

A sodium silicate solution was prepared by adding 135 pounds of 28.4% sodium silicate solution

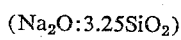
$(Na_2O:3.25SiO_2)$ to 91 gallons of water. The solution was agitated for 30 minutes and then pumped, upflow, through a column containing "Nalcite HCR," a cation-exchange resin in the hydrogen form. Ninety-six gallons of a silica sol was obtained as an effluent from the ion-exchange column, the sol having a silica concentration of 3.05 percent $SiO_2$. The sol had a pH of 2.5 corresponding to a very nearly infinite $SiO_2:Na_2O$ weight ratio. This ratio was adjusted to 64:1 by adding 4.61 pounds of the original concentrated sodium silicate solution with agitation, the pH being about 8.2.

After pH adjustment the sol was heated from 25° C. to 85° C. in one hour with sparge steam. The sol was then divided into two bodies, approximately 20 gallons being charged to a constant volume, vacuum, forced circulation evaporator, this leaving about 70 gallons of sol in a hold tank. The vacuum in the evaporator was adjusted so that evaporation was carried out at 85° C. The feed rate of the sol from the hold tank to the evaporator was equal to the condensate rate from the evaporator so that the volume in the evaporator remained constant. The silica sol feed to the evaporator was held at 85° C. throughout the evaporation by external heat.

Six hours and five minutes from the start of heating, the concentration of the evaporator contents had reached 17.35 percent $SiO_2$. The sol in the evaporator was then cooled to 30° C. by passing cooling water through the evaporator calandria. The surface area of the concentrated silica sol was found to be 510 m.²/g. of silica. The surface area of the sol before the evaporation was found to be about 1500 m.²/g. In a similar process, identical except that the feed sol was not heated, the surface area of silica in the final product was 200 m.²/g., showing that excessive particle growth in the evaporator had been avoided by a process of the present invention.

*Example 2*

A sodium silicate solution was prepared by adding 169 pounds of 28.4 percent sodium silicate solution

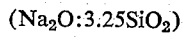
$(Na_2O:3.25SiO_2)$ to 115 gallons of water. The solution was agitated for 30 minutes and then pumped through a column containing an acid-regenerated cation exchange resin. "Nalcite HCR." There was obtained 104½ gallons of a silica sol effluent having a silica concentration of 3.23 percent $SiO_2$.

Silica sol obtained from the ion exchange column had a pH of about 2.5. This pH was adjusted to about 8.1 by adding 4.69 pounds of the original sodium silicate solution.

The sol was heated from room temperature (25° C.) to 98° C. in one hour with sparge steam.

The sol was then divided into two bodies by charging 15 gallons to a constant volume, forced circulation evaporator. The remainder of the sol, 85 gallons, was retained in a hold tank.

The silica sol in the evaporator was concentrated by evaporation of water at atmospheric pressure and 100° C. The sol from the hold tank was fed to the evaporator at a rate equal to the condensate rate of the evaporator so that the volume in the evaporator remained constant. The silica sol feed to the evaporator was held at 98° C. throughout the evaporation by external heat.

Six hours from the start of heating the concentration of silica in the evaporator had reached 17.7% $SiO_2$. The sol was then cooled to 30° C. by passing cooling water through the evaporator calandria. The surface area of the concentrated sol was found to be 406 m.²/g. of silica whereas the surface area of the sol before evaporation was 1500 m.²/g. of silica.

We claim:

1. In a process for producing a concentrated, aqueous silica sol in which the silica is present as uniformly sized particles in the size range of 4 to 10 millimicrons, the steps comprising preparing separate bodies of an aqueous silica sol containing less than 10 percent by weight of silica, the silica being in the form of particles no larger than the size desired in the final product and each body of sol having a pH in the range of 7.0 to 10.5, simultaneously heating the sol bodies to a temperature in the range from 50 to 150° C. and, while maintaining the separate bodies at substantially the same temperature, evaporating water from one body of sol, adding sol from the second body to replace the evaporated water and keep the volume of the first body substantially constant, and continuing the evaporation and replacement at constant volume until the silica content of the first body of sol is from 10 to 50 percent $SiO_2$.

2. A process of claim 1 in which the aqueous silica sol used as the starting material is prepared by passing a dilute alkali metal silicate solution through a body of a cation exchange resin in the hydrogen form to make a dilute silica sol, and adjusting the pH of the dilute sol to the range of 7.0 to 10.5 by adding an alkali selected from the group consisting of alkali metal hydroxides and alkali metal silicates.

3. A process of claim 1 in which the starting silica sol contains sufficient sodium alkali to give it an $SiO_2:Na_2O$ weight ratio of from 30:1 to 300:1.

References Cited in the file of this patent

UNITED STATES PATENTS

| | | |
|---|---|---|
| 2,574,902 | Bechtold et al. | Nov. 13, 1951 |
| 2,577,484 | Rule | Dec. 4, 1951 |
| 2,601,235 | Alexander et al. | June 24, 1952 |
| 2,671,056 | Wolter | Mar. 2, 1954 |
| 2,680,721 | Broge et al. | June 8, 1954 |
| 2,750,345 | Alexander | June 12, 1956 |